US011230336B2

(12) United States Patent
Yu et al.

(10) Patent No.: US 11,230,336 B2
(45) Date of Patent: Jan. 25, 2022

(54) DEVICE MOUNTING SYSTEM FOR A VEHICLE

(71) Applicant: NEUTRON HOLDINGS, INC., San Francisco, CA (US)

(72) Inventors: Jeffrey Yu, Brooklyn, NY (US); Nicholas Foley, Brooklyn, NY (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 0 days.

(21) Appl. No.: 16/362,435

(22) Filed: Mar. 22, 2019

(65) Prior Publication Data
US 2019/0291804 A1    Sep. 26, 2019

Related U.S. Application Data

(60) Provisional application No. 62/647,373, filed on Mar. 23, 2018.

(51) Int. Cl.
*B62J 11/00* (2020.01)
*F16B 2/10* (2006.01)

(52) U.S. Cl.
CPC ............... *B62J 11/00* (2013.01); *F16B 2/10* (2013.01)

(58) Field of Classification Search
CPC .... F16M 11/041; F16M 13/022; F16M 13/00; B60R 11/0241; B60R 11/0258; B60R 2011/0071; F16B 2/10
See application file for complete search history.

(56) References Cited

U.S. PATENT DOCUMENTS

| 5,033,528 | A | * | 7/1991 | Volcani | ................ | F16M 13/022 160/351 |
| 5,103,384 | A | * | 4/1992 | Drohan | .................. | F16M 11/40 362/190 |
| 5,402,558 | A | * | 4/1995 | Santapa | ............... | A47G 25/485 223/91 |
| 6,165,129 | A | * | 12/2000 | Bates | ................. | A61B 5/02444 600/382 |
| 7,080,812 | B2 | * | 7/2006 | Wadsworth | ............ | B60R 11/02 248/316.1 |
| 10,161,429 | B2 | * | 12/2018 | Goffman | ................ | F16M 11/10 |

(Continued)

FOREIGN PATENT DOCUMENTS

| CN | 105034967 | 11/2015 |
| CN | 205781841 | 12/2016 |

(Continued)

OTHER PUBLICATIONS

Amazon, Kolpin 21550 Black Rhino Grip XLR—Single, 2 pack, 2017, Amazon (Year: 2017).*

(Continued)

*Primary Examiner* — Brian D Nash
(74) *Attorney, Agent, or Firm* — Dentons US LLP

(57) ABSTRACT

A mobile device mounting system includes two jaws. The first jaw is generally fixed in position to a wheeled vehicle. The second jaw is pivotably connected to the first jaw via a hinge. The second jaw can be positioned into a closed or open position relative to the first jaw. A biasing element is used to move the second jaw towards the closed position. A support element spans the first and second jaws and may be used to support the mobile device when the mobile device is placed in the mounting system.

14 Claims, 15 Drawing Sheets

(56) References Cited

U.S. PATENT DOCUMENTS

| | | | | |
|---|---|---|---|---|
| 10,427,704 B2* | 10/2019 | Bacallao | ............... | B62B 3/1416 |
| 10,512,322 B2* | 12/2019 | Washington | ........... | F16M 11/14 |
| 2003/0127878 A1* | 7/2003 | Gort | ........................ | B60R 11/00 |
| | | | | 296/37.8 |
| 2005/0092798 A1* | 5/2005 | Borgman | ................ | B62J 11/00 |
| | | | | 224/420 |
| 2007/0122141 A1* | 5/2007 | Agevik | ................. | F16M 13/00 |
| | | | | 396/419 |
| 2008/0128571 A1* | 6/2008 | Dostaler | ................... | F16B 2/10 |
| | | | | 248/229.13 |
| 2009/0060473 A1* | 3/2009 | Kohte | ................. | F16M 11/041 |
| | | | | 386/200 |
| 2011/0121148 A1* | 5/2011 | Pernia | ................ | B60R 11/0241 |
| | | | | 248/207 |
| 2011/0162173 A1* | 7/2011 | Ciminski | ........... | A63B 21/0728 |
| | | | | 24/303 |
| 2011/0308045 A1* | 12/2011 | Mizuguchi | .............. | F02B 63/04 |
| | | | | 16/429 |
| 2012/0174375 A1* | 7/2012 | Mcleod | ............... | F16M 13/022 |
| | | | | 29/428 |
| 2013/0002110 A1* | 1/2013 | Nemoto | ............. | B60R 11/0211 |
| | | | | 312/248 |
| 2014/0103087 A1* | 4/2014 | Fan | ........................ | B60R 11/02 |
| | | | | 224/544 |
| 2015/0028075 A1* | 1/2015 | Khatchatrian | ...... | B60R 11/0258 |
| | | | | 224/483 |
| 2016/0032950 A1* | 2/2016 | Owens | ...................... | F16B 2/10 |
| | | | | 435/289.1 |
| 2016/0183393 A1* | 6/2016 | Groom | ..................... | B62B 9/26 |
| | | | | 280/33.992 |
| 2016/0249749 A1 | 9/2016 | Bull | | |
| 2016/0311359 A1* | 10/2016 | Hon | ........................ | B60P 3/073 |
| 2018/0295975 A1* | 10/2018 | Washington | ........... | F16M 11/14 |
| 2019/0111395 A1* | 4/2019 | Greenizen | ................ | B25B 5/14 |
| 2019/0291804 A1* | 9/2019 | Yu | ........................... | B62J 11/00 |

FOREIGN PATENT DOCUMENTS

| | | |
|---|---|---|
| CN | 206202155 | 5/2017 |
| KR | 1020120010503 | 2/2012 |

OTHER PUBLICATIONS

Kolpin, Kolpin Rhino Grip XLR, 2017, Google (Year: 2017).*
PCT International Search Report and Written Opinion in PCT/US2019/023725, dated Jul. 5, 2019, 11 pages.

* cited by examiner

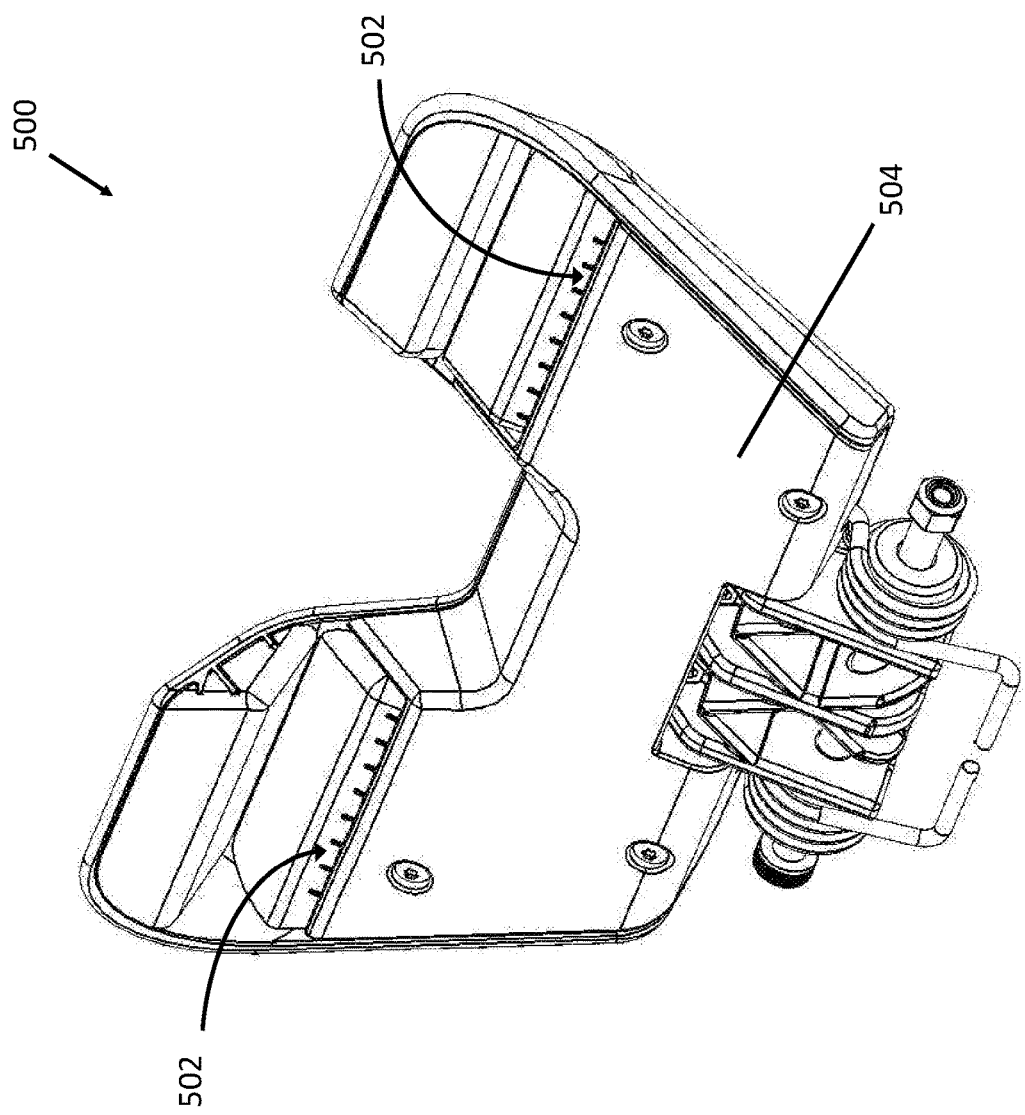

DEVICE MOUNTING SYSTEM FOR A VEHICLE

CROSS-REFERENCE TO RELATED APPLICATIONS

This application is claims priority to and the benefit of U.S. Provisional Application Ser. No. 62/647,373, filed Mar. 23, 2018, entitled "Mobile Device Mount," the disclosure of which is hereby incorporated by reference herein in its entirety.

BACKGROUND

Mobile devices have become many users' preferred resource for navigation. Mobile devices can run tools or applications that provide maps and automated directions e.g., verbal directions and moving maps. Mobile devices are often hand held; however, when a user's hands are otherwise occupied, such as when driving or riding a vehicle, the user's ability to hold the mobile device and view the navigation tools is hindered.

SUMMARY

In one aspect, the technology relates to an apparatus having: a first jaw; a hinge connected to the first jaw; a second jaw pivotably connected to the first jaw via the hinge, wherein the second jaw is positionable relative to the first jaw into a closed position and an open position; a biasing element for biasing the second jaw towards the closed position; and a support element spanning the first jaw and the second jaw. In an example, the biasing element has a torsion spring. In another example, the torsion spring is disposed proximate the hinge. In yet another example, the support element includes a flexible material. In still another example, the first jaw at least partially defines a first groove and wherein the second jaw at least partially defines a second groove, wherein the first groove is disposed on the first jaw so as to face the second groove.

In another example of the above aspect, the support element is substantially aligned with the first groove and the second groove when the second jaw is in the open position. In an example, the support element is taut when the second jaw is in the open position. In another example, the second jaw at least partially defines a gap that bisects the second groove, and wherein the support element is connected to the second jaw on two sides of the gap. In yet another example, the support element includes the biasing element. In still another example, the support element further includes a plurality of rigid elements and a hinge pivotably connecting the plurality of rigid elements. In another example, the biasing element has an elastic element.

In another aspect, the technology relates to a vehicle having: a frame; a steering element movably connected to the frame; a wheel disposed at an end of the steering element distal from the frame; and a mobile device holder having: a first jaw connected to the vehicle proximate the steering element; a hinge; a second jaw pivotably connected to the first jaw via the hinge, wherein the second jaw is biased towards the first jaw; and a support element spanning the first jaw and the second jaw, wherein the mobile device holder is positioned relative to the wheel so that the hinge is disposed at an elevation higher than the wheel and lower than the support element. In an example, the support element is configured to at least partially support thereon a mobile device. In another example, the mobile device includes a smartphone. In yet another example, at least one of the first jaw and the second jaw includes a width and wherein the width is greater than a maximum dimension of the smartphone. In still another example, the first jaw is connected to the steering element. In another example, the support element is substantially water repellant.

In another aspect, the technology relates to a method of accessing a support system having a first jaw and a second jaw pivotably connected to the first jaw, the method including: grasping the second jaw; pulling the second jaw away from the first jaw; exposing a support element spanning the first jaw and the second jaw; disposing a mobile device on the support element; and releasing the second jaw, wherein releasing the second jaw causes the second jaw to pivot towards the first jaw. In an example, the method further includes providing the support system. In another example, releasing the second jaw aligns an edge of the mobile device with a groove defined by at least one of the first jaw and the second jaw so as to sit the edge in the groove.

BRIEF DESCRIPTION OF THE DRAWINGS

FIG. 6 is a rear perspective view of a pivoting jaw of a mobile device mounting system.

DETAILED DESCRIPTION

The mobile device mounting systems described herein are configured to receive a mobile device and securely hold the mobile device during movement of the vehicle, including over bumps and other obstacles that are typically present on roads and bike lanes. The mobile device may be a smartphone, tablet, e-reader, etc. By positioning the mobile device in the mounting system, the screen of the mobile device is readily visible to the rider of the bicycle. This allows the rider to more safely observe the mobile device, for example, to follow directions, view maps, or access other alerts. This gives the rider a more preferable option than holding their device with one hand, while attempting to steer the bicycle with the other hand. In that regard, the mounting system, in broad concept, operates in a similar manner as other mobile device mounting systems utilized for holding a mobile device in other vehicles (e.g., those mounted on the dashboards of cars).

The mounting system of the present application, however, includes a number of other features to improve the rider's acceptance of and experience with the mounting system. These features include, for example, a support element disposed below the mobile device when inserted into the mounting system. This support device helps give a visual assurance to the rider that their mobile device is being safely cradled from below and is unlikely to fall, even in the event of a significant bump.

Further, the support element helps align the mobile device with grooves in the mounting system, to simplify the device securement process and protects the device from debris that may be directed upward during operation of the bicycle. The size and configuration of the mounting system also helps deter theft of the mobile device, as well as protect the device from striking the ground should the bicycle be dropped accidentally (e.g., when unlocking the bicycle from a supporting structure or when stopping the bicycle). Other advantages of the present technology will be apparent upon review of the present disclosure.

Figure 1:
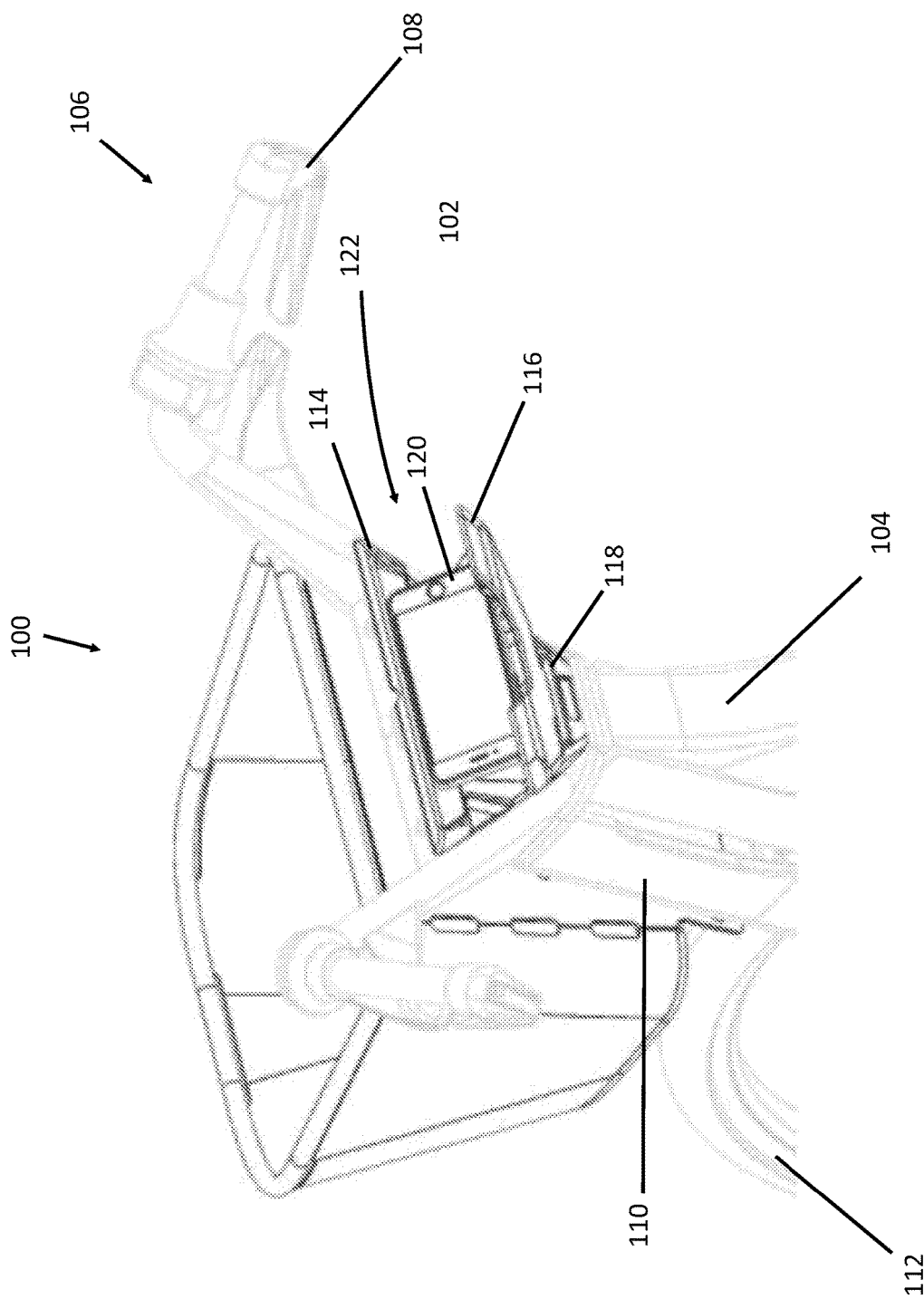
FIG. 1 is a perspective view of a vehicle incorporating a mobile device mounting system.

FIG. 1 is a perspective view of a vehicle 100 incorporating a mobile device mounting system 102. The technologies described herein are described in the context of bicycles for clarity. However, these technologies may also be incorporated into other vehicles, such as mopeds, scooters, motorcycles, ATVs, etc. The bicycle 100 includes a frame 104 and a steering element 106 movably (e.g., rotatably) connected to the frame 104. The steering element 106 is utilized to steer the bicycle 100 in a desired direction of travel and includes a steering implement 108 (e.g., handlebars) and a front fork 110 rigidly connected thereto. A wheel 112 is rotatably secured to front fork 110. As such, rotation of the handlebars 108 by a rider rotates the front fork 110 and, by extension, the wheel 112.

In some examples, the mounting system 102 is fixed to the handlebars 108, although other locations are contemplated. For example, the mounting system 102 may be secured to a portion of the frame 104 (e.g., a downtube or other component). The mounting system 102 is secured to the bicycle via a first, fixed jaw 114. The fixed jaw 114 may be secured with screws, bolts, press fit fasteners, zip ties, or other mechanical fasteners. A second, pivotable jaw 116 is pivotably connected to the fixed jaw 114 at a pivoting hinge 118.

It should be noted, that the mobile device 120 is secured in an upper portion of the mounting system 102, generally above the level of the hinge 118. This hinge 118 is disposed generally higher than the wheel 112 and thus, the mobile device 120 may be a considerable distance above the ground during movement of the bicycle. The position of the mobile device 120 on the bicycle 100, then, is relevant to the further features of the mounting system 102, as described below.

Figure 2A:
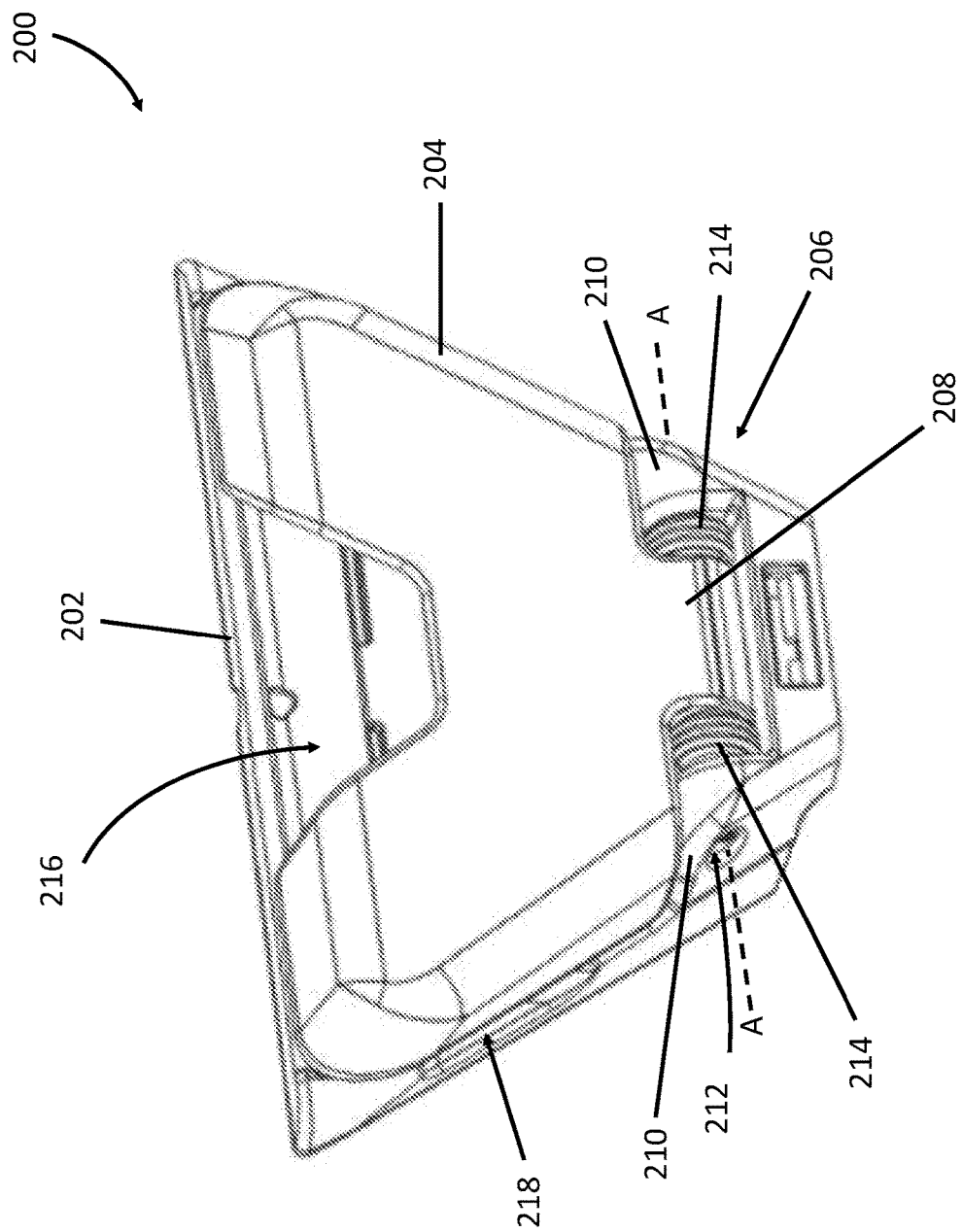
FIG. 2A is a front perspective view of a mobile device mounting system in a closed configuration.

FIG. 2A is a front perspective view of a mobile device mounting system 200 in a closed configuration. As used herein, the term "front" refers to portions of the mounting system 200 that generally face towards the rider when the rider is using a vehicle on which the mounting system 200 is mounted. The term "rear," conversely, is used to describe those surfaces that face generally away from the rider.

Here, the mounting system 200 includes a fixed jaw 202 that may be secured to a bicycle or other vehicle (not shown). A pivotable jaw 204 is pivotably secured to the fixed jaw 202 at a hinge 206. In this case, a central knuckle 208 of the hinge 206 is connected to the pivotable jaw 204, while outer knuckles 210 of the hinge 206 are connected to the fixed jaw 202.

The hinge 206 defines a barrel 212 having an axis A. The barrel 206 is configured to receive a bolt, pin, or other elongate shaft (not shown) about which the pivotable jaw 204 pivots. The mounting system 200 further includes at least one (but in this example, two) biasing element 214 in the form of a torsion spring. These torsion springs 214 are configured to substantially surround the pin received in the barrel 206 and are used to bias the pivotable jaw 204 to the closed position depicted in FIG. 2A.

The pivotable jaw 204 defines a centrally-located gap 216, which may be used as a grip by the rider. The grip allows a rider to more easily pull the pivotable jaw 204 away from the fixed jaw 202 during use. Additionally or alternatively, the fixed jaw 202 may define one or more edge recesses 218 into which a rider's finger(s) may be inserted, again to more easily pull the pivotable jaw 204 away from the fixed jaw 202.

Figure 2B:
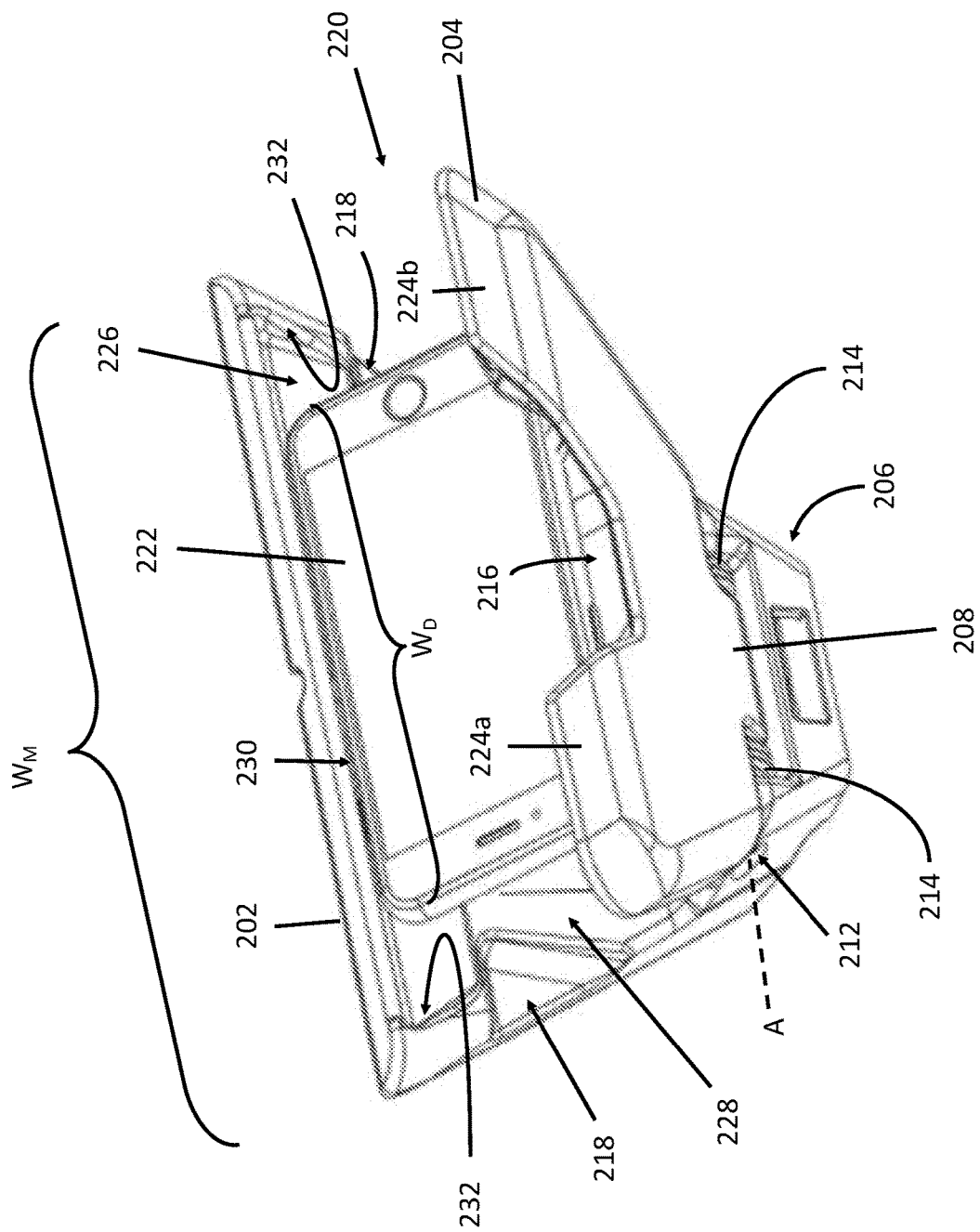
FIG. 2B is a front perspective view of the mobile device mounting system of FIG. 2A in an open configuration.

FIG. 2B is a front perspective view of the mounting system 200 of FIG. 2A in an open configuration. A number of features of the mounting system 200 are described above with regard to FIG. 2A and thus are not necessarily described further.

In the open configuration, the fixed jaw 202 and the pivotable jaw 204 are separated, thus forming a mouth 220 therebetween. A mobile device 222 is secured within the mouth 220 of the mounting system 200, in this case, in a landscape orientation.

A number of features are depicted in FIG. 2B. For example, the gap 216 that defines the grip is sized so as to allow the mobile device 222 to span from a first arm 224a to a second arm 224 of the pivotable jaw 204. This allows the mobile device 222 to be securely held in the mouth 220, while enabling a larger portion of the mobile device 222 to be unobstructed by the pivotable jaw 204.

The fixed jaw 202 also at least partially defines a groove 226 in a front surface 228 thereof. The groove 226 is configured to receive an edge 230 of the mobile device 222 so as to securely hold the mobile device 222 in the mounting system 200. The groove 226 (a well as a corresponding groove 236 in the pivotable jaw 204, depicted below) ensure proper alignment of the mobile device 222 in the mounting system 200 and secure retention thereof.

Either or both of the grooves 226, 236 may be lined with or formed from a resilient or high friction material such as foam, rubber, plastic, etc., to prevent slippage of the mobile phone 222 in the grooves 226, 236. The groove 226 terminates at a buttress 232, which extends a distance above a surface of the groove 226. The buttress 232 acts as an end wall or stop to prevent sliding movement of the mobile device 222 out of the end of the groove 226.

It should be noted that sliding movement of the mobile deice 222 is nevertheless unlikely due to the presence of the high-friction material that forms the groove 226, as well as the holding force exerted against the mobile device by the torsion springs 214, which bias the pivotable jaw 204 towards the fixed jaw 202. Regardless, the presence of the buttresses 232 may provide a rider with peace of mind that her mobile device 222 is unlikely to inadvertently slide out the end of the groove 226, thus increasing her acceptance and use of the mounting system 200.

The fixed jaw 202 and the pivotable jaw 204 are also sized so as to protect the mobile device 200 from inadvertent contact resulting in dislodgment of the mobile device 200 or from the potential of opportunistic theft. More specifically, the jaws 202, 204 of the mounting system 200 each include a width which, in this case are the same width $W_M$. This is greater than a width $W_D$ of the mobile device 200. This larger width $W_M$ may serve a number of functions.

For example, the larger width $W_M$ prevents the mobile device from being inadvertently contacted and dislodged from the mounting system 200. Such contact could come inadvertently from the rider or a passerby, or even from the ground or a vertical obstruction such as a post, pole, or other obstacle. Such contact with stationary objects may occur if the rider drops or falls from the bicycle, or if the rider hits a vertical obstruction with the bicycle. Thus, by having a width $W_M$ that exceeds the width $W_D$ of the mobile device 222, the mounting system 200 provides a measure of physical protection to the mobile device 222.

With regard to theft, the size (e.g., width $W_M$) of the mounting device 200 relative to the mobile device 222 helps deter or prevent opportunistic theft by nestling the relatively smaller mobile device 222 within the relatively larger mounting system 200. The robust biasing force of the torsion springs 214 further reduce the likelihood of theft by making it difficult to simply pull the mobile device 222 from the mounting system 200 without pivoting the pivotable jaw 204 away from the fixed jaw 202.

Further, although FIG. 2B depicts the mobile device 222 disposed within the mounting system 200 with a widest dimension $W_D$ aligned with the axis A, the mounting system 200 may be configured to be opened further so as to accommodate the mobile device 222 in an orientation orthogonal to that depicted in FIG. 2B (e.g., a portrait orientation). A sufficient range of motion also enables the mounting system 200 to accommodate larger mobile devices such as tablets.

Figure 3A:
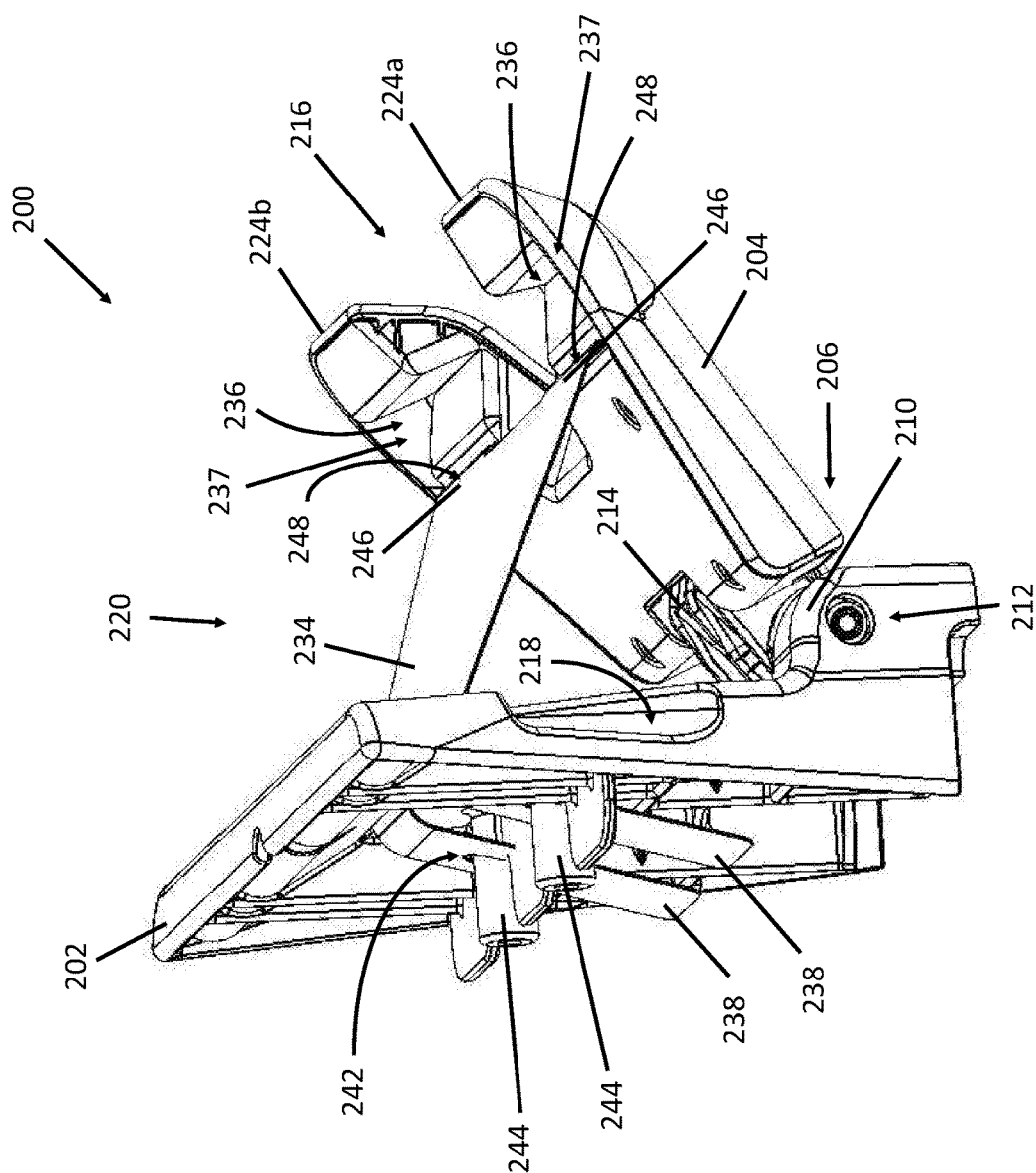
FIG. 3A is a side perspective view of the mobile device mounting system of FIG. 2A in an open configuration.
Figure 3B:
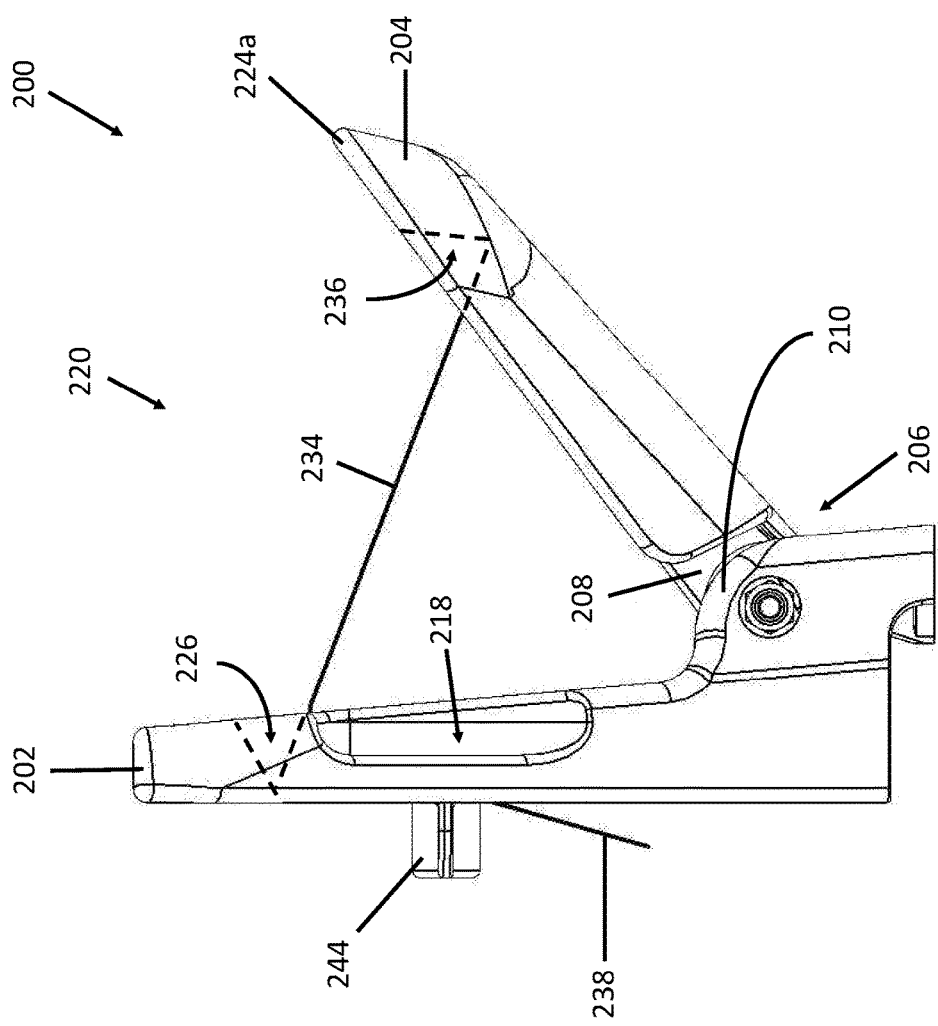
FIG. 3B is a side view of the mobile device mounting system of FIG. 2A in an open configuration.
Figure 3C:
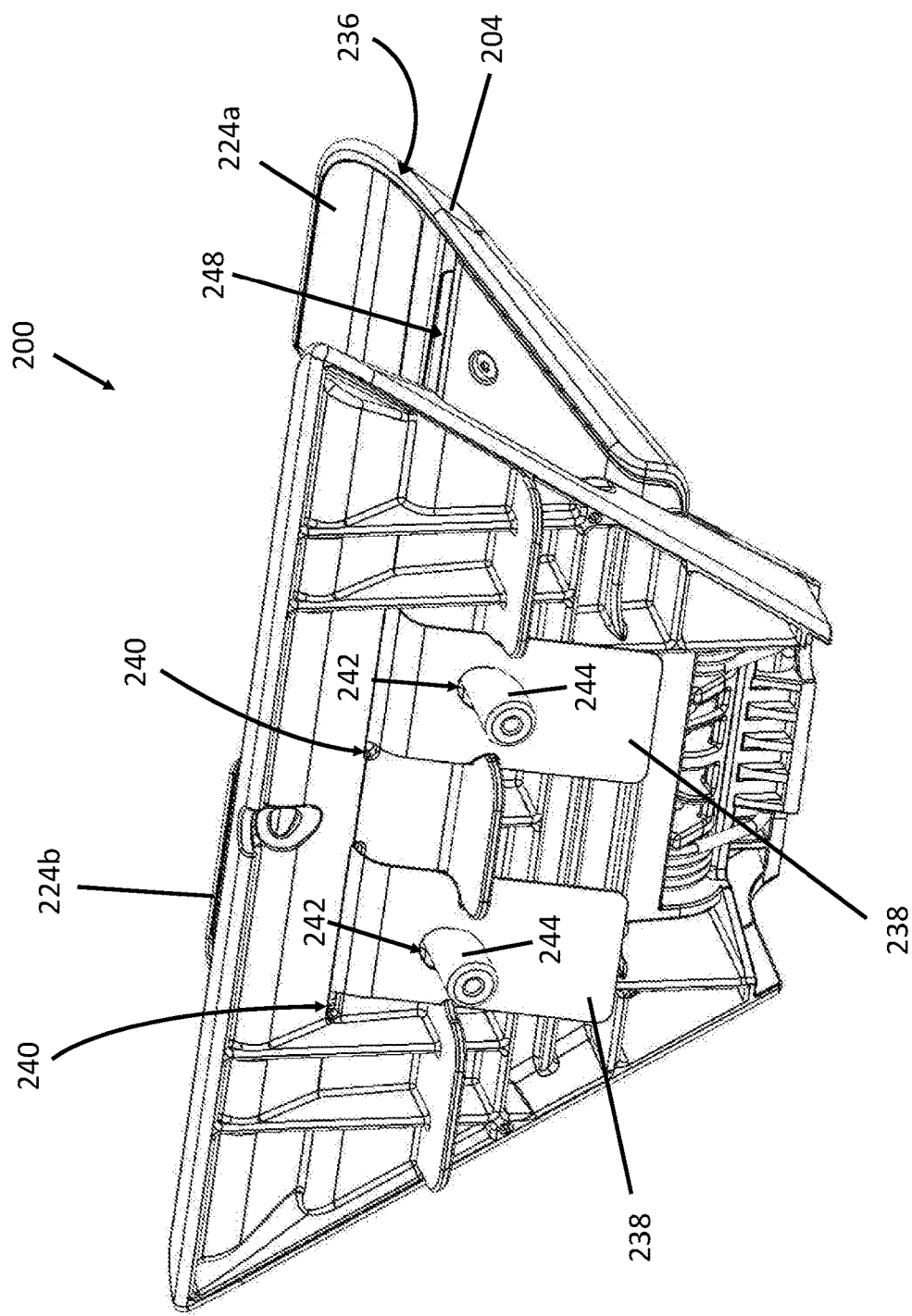
FIG. 3C is a rear perspective view of the mobile device mounting system of FIG. 2A in an open configuration.

FIG. 3A is a side perspective view of the mobile device mounting system 200 of FIG. 2A in an open configuration. FIGS. 3B and 3C depict the mounting system 200 from side, and rear perspective views, respectively. FIGS. 3A-3C are described concurrently and, it should be noted, depict an exposed rear portion of the fixed jaw 202 for illustrative purposes. A number of features of the mounting system 200 are described above with regard to previous figures and thus are not necessarily described further.

FIGS. 3A-3C depict additional components of the mounting system 200. For example, grooves 236 are disposed on the pivotable jaw 204. These grooves 236 are defined by each of the arms 224a, 224b of the pivotable jaw 204. Thus, the grooves 236 are effectively bisected or separated by the gap 216 in the pivotable jaw 204. Further, portions of the groove 236 proximate the outer edges of each arm 224a, 224b terminate at buttresses 237, similar to the buttresses 232 on the fixed jaw 202.

A support element 234 spans the fixed jaw 202 and the pivotable jaw 204. The support element 234 may be taut when the pivotable jaw 204 is in the open position. The support element 234 may be a flexible sheet material, such as a suitable cloth, screen, mesh, sheet, etc. The support material 234 may be made of fabric, plastic, flexible metal, or other material. In one example, the support member 234 may be a high density polyethylene fiber such as TYVEK™, available from DuPont.

The support member 234 may perform a number of functions. For example, the support member 234 is helpful in positioning a mobile device (not shown) in the mounting device 200. The rider need only position a mobile device in the mouth 220 of the mounting system 200 and resting on the support element 234, and release the pivotable jaw 204.

The biasing force of the torsion springs 214 returns the pivotable jaw 204 toward the closed position.

As the separation between the pivotable jaw 204 and the fixed jaw 202 is reduced, the support element 234 guides edges of the mobile device into the grooves 226, 236 (on the pivotable jaw 204) until the mobile device is held in place. In another example, the support member 234, if made from a sufficiently water-resistant or water-proof material, may prevent road spray from contacting the mobile device from below as the bicycle is being ridden. In yet another example, when the bicycle is stationary and unused, a water-resistant or water-proof support member 234 may help shed water or debris that drops into the space between the fixed jaw 202 and the pivoting jaw 204, thus protecting the hinge 206 and/or torsion springs 214 from exposure to the elements.

The configuration of the mounting system 200 enables the above-referenced guiding of the mobile device into the proper seated position within the grooves 226, 236. The support element 234 (here, in the form of a flexible sheet material) includes two fixed jaw tabs 238 that are configured to engage the fixed jaw 202. The fixed jaw tabs 238 are inserted into fixed jaw slots 240 defined by the fixed jaw 202.

Retention holes 242 may be positioned over anchors 244 that extend from the fixed jaw 202 to hold the support element 234 in place relative to the fixed jaw 202. Similarly, the support element 234 also includes two pivotable jaw tabs 246 that are configured to engage the pivotable jaw 204. The pivotable jaw tabs 246 are inserted into pivotable jaw slots 248 defined by the pivotable jaw 204 and secured therein. Thus, the support element 234 contacts and engages the fixed jaw 202 and the pivotable jaw 204 at the respective slots 240, 248. These slots 240, 248 are disposed proximate the respective grooves 226, 236, as most clearly depicted in FIG. 3B.

Thus, when the mounting system 200 is in the open position depicted in FIGS. 3A-3B, the support member 234 is substantially aligned with the grooves 226, 236. In this context, the term "aligned" is not indicative of a precise geometric relationship. Rather, "aligned" as used herein, means the support member 234 is disposed sufficiently proximate to the grooves 226, 236 so as to direct edges of a mobile device into the grooves 226, 236, when the mobile device is simply resting on or being supported by the support element 234 when the pivotable jaw 204 is released, so as to return towards the closed positon.

In examples where the support element described above is a thin, flexible material, damage to the support element is possible. In certain instances that damage may necessitate replacement. In other examples, the support element may include graphics thereon for instructions for use, advertisements, etc. Should those instructions become superceded or advertisements dated, replacement of the support element may also be required. Due to the construction of the support element and the other components of the mounting system, replacement may be easily performed in the field by a technician. FIGS. 4-6B address the features directed to replaceability of the support element.

Figure 4:
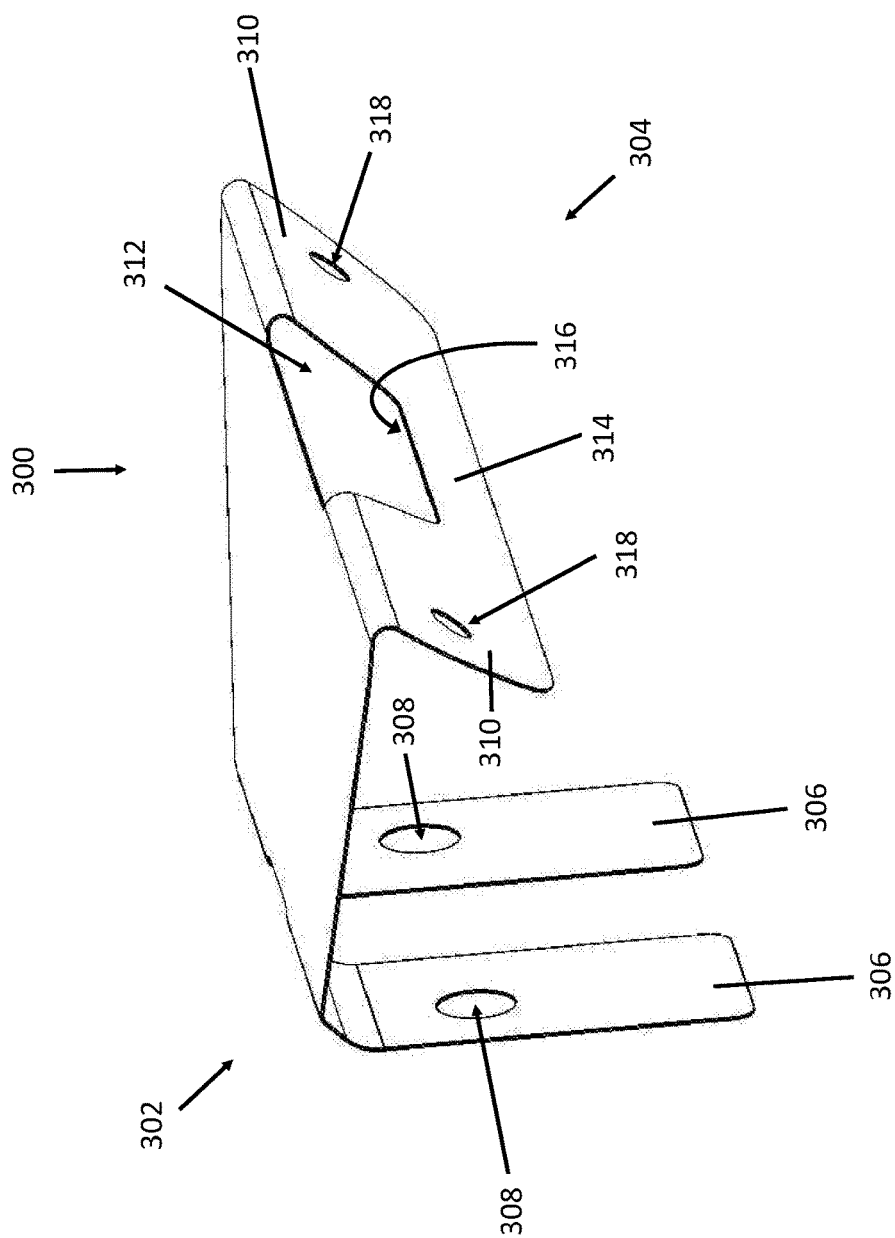
FIG. 4 is a perspective view of a support element of a mobile device mounting system.

FIG. 4 is a perspective view of a support element 300 of a mobile device mounting system. The support element 300 is generally a single piece of flexible material, and has a fixed jaw end 302 and a pivotable jaw end 304. At the fixed jaw end 302 are a plurality of fixed jaw tabs 306 that each define a retention hole 308 that may be reinforced with grommets or the like. At the pivotable jaw end 304 two pivotable jaw tabs 310 may at least partially define an opening 312 therebetween.

In the depicted example, material 314 bridging the two pivotable jaw tabs 310 help further define the opening 312, including an engaging edge 316. Each pivotable jaw tab 310 also defines a retention hole 318 that may be reinforced with grommets or the like. Installation of the support element 300 into a mounting system is described further in the context of FIGS. 5-6B.

Figure 5:
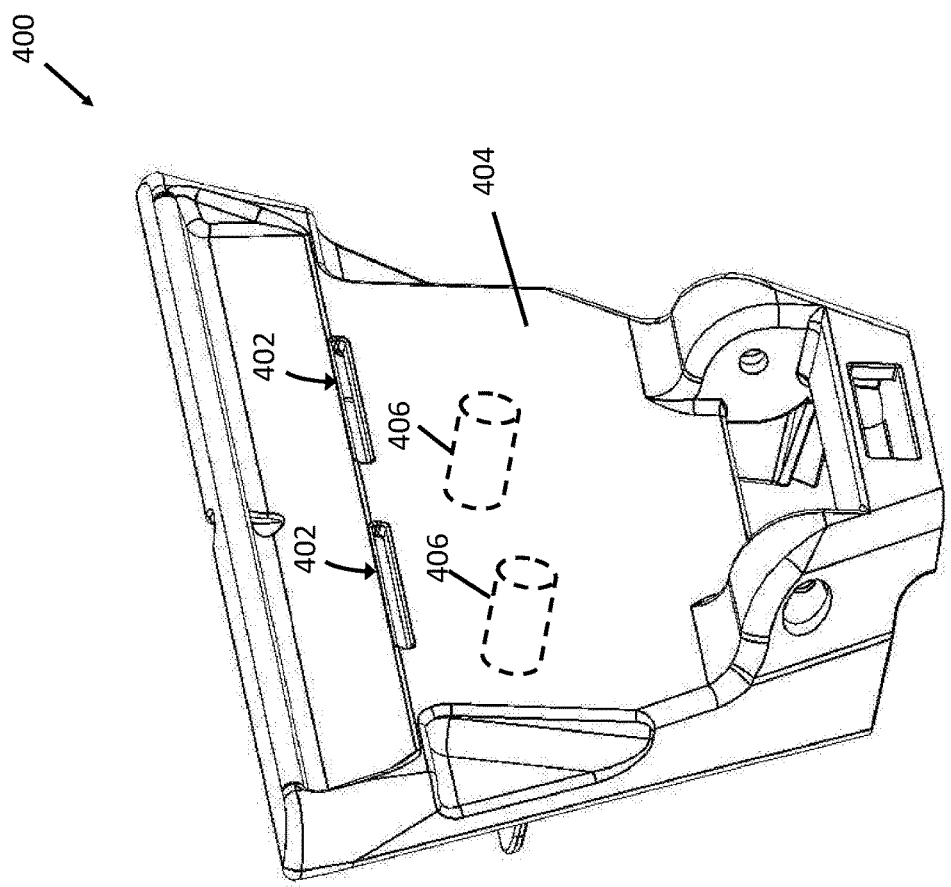
FIG. 5 is a front perspective view of a fixed jaw of a mobile device mounting system.

FIG. 5 is a front perspective view of a fixed jaw 400 of a mobile device mounting system. Certain features of similar fixed jaws are described elsewhere herein and thus are not necessarily described further. Relevant to installation of the support element 300 of FIG. 4, the fixed jaw defines two slots 402 that are formed in a facing surface 404 of the fixed jaw.

To install a new support element 300, the fixed jaw 400 is typically removed from the bicycle, so as to expose the rear surface thereof (for example, as depicted in FIG. 3C). A fixed jaw tab 306 is inserted into each of the fixed jaw slots 402, then connected to the fixed jaw anchors 406 (shown dashed in FIG. 5). When securing the fixed jaw onto to the bicycle, the anchors 406 may be engaged with corresponding structures on the bicycle, so as to prevent disengagement of the fixed jaw tabs 306 of the support element 300.

Figure 7A:
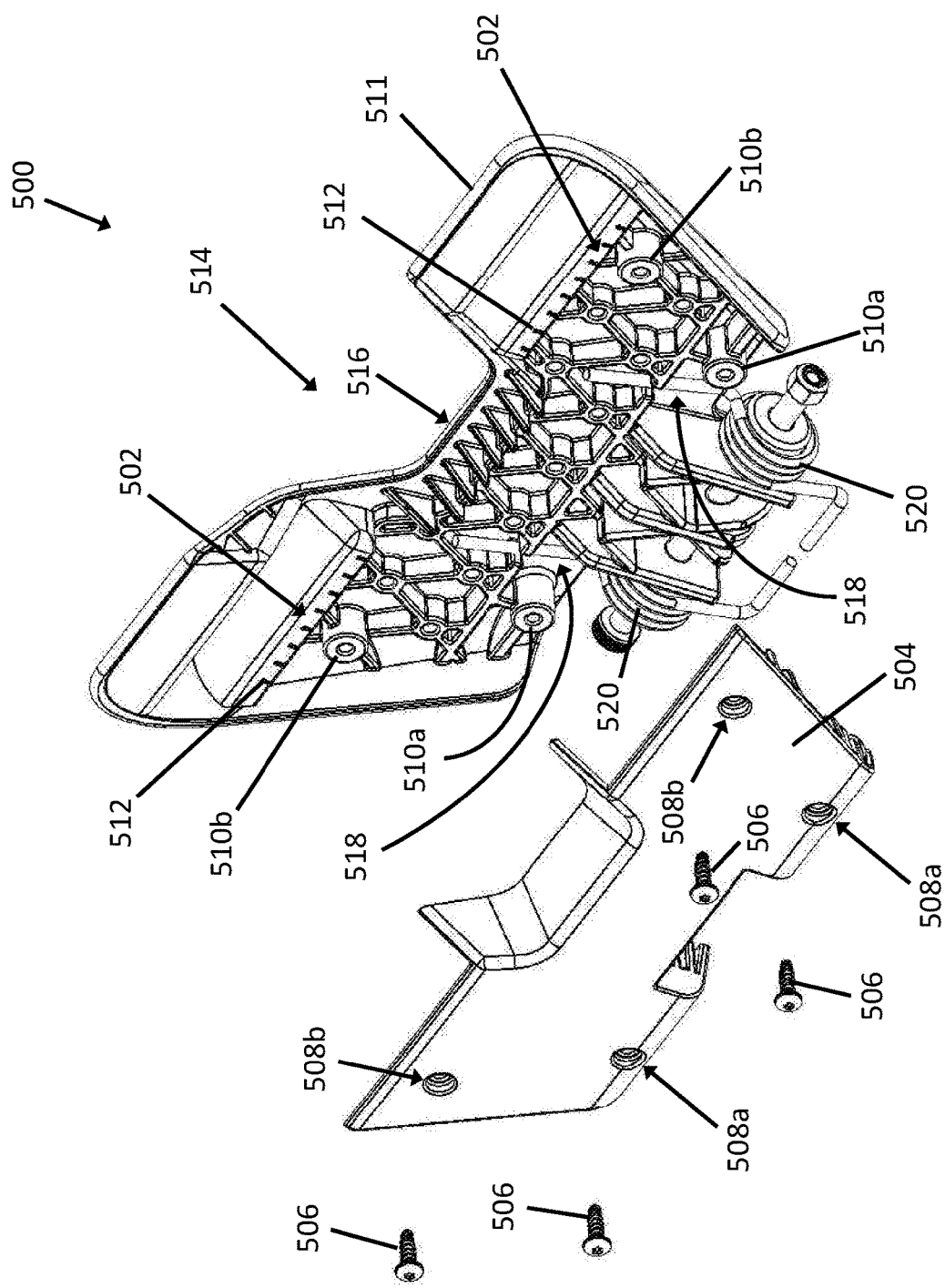
FIGS. 7A-7B are partially exploded rear and front perspective views, respectively, of the pivoting jaw depicted in FIG. 6.
Figure 7B:
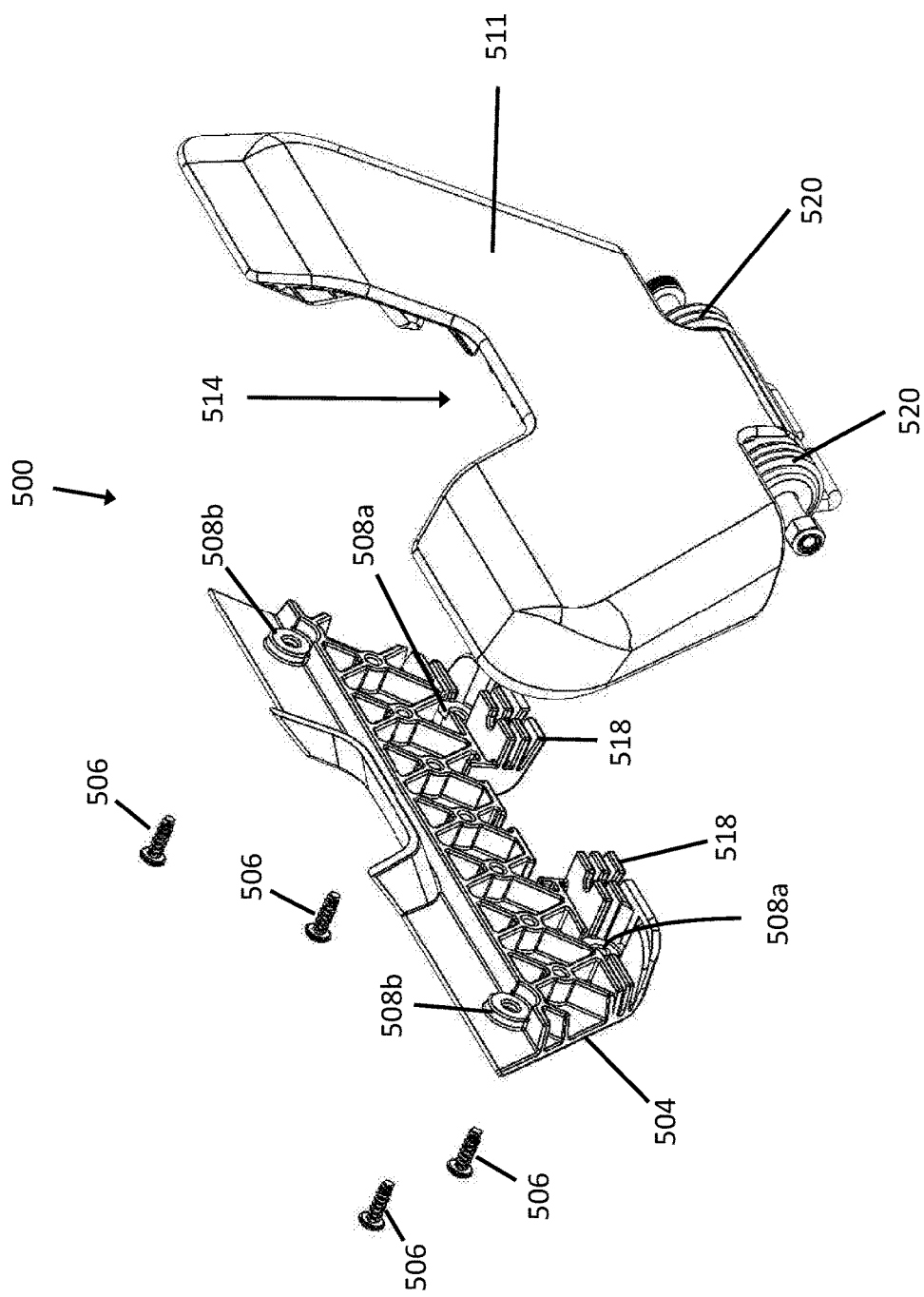

FIG. 6 is a rear perspective view of a pivotable jaw 500 of a mobile device mounting system. FIGS. 7A and 7B are partially exploded rear and front perspective views, respectively, of the pivotable jaw 500 depicted in FIG. 6. FIGS. 6-7B are described concurrently. Certain features of similar pivotable jaws are described elsewhere herein and thus are not necessarily described further.

Relevant to installation of the support element 300 of FIG. 4, the pivotable jaw 500 defines two slots 502 that are at least partially defined by a rear plate 504 of the pivotable jaw 500. To install a new support element 300, the rear plate 504 is removed by unscrewing a number of screws 506, bolts, or other fasteners from a plurality of openings 508 therein. Screws 506 passing through openings 508a are secured to bosses 510a that project from a front plate 511 into an interior of the pivotable jaw 500, while screw 506 passing through openings 508b are secured to bosses 510b.

The openings 318 in the support element 300 are secured to the bosses 510b. Due to the considerable width of the pivotable jaw end 304 of the support element 300, the pivotable jaw 500 includes additional features to distribute the holding load across the width thereof. For example, the slots 502 may include a number of teeth 512 that are configured to engage the pivotable jaw tabs 310 of the support element 300 when installed therein. Additionally, proximate a gap 514, a comb 516 is disposed so as to engage the engaging edge 316 of the support element 300. In addition to securing the support member 300, the mating front plate 511 and rear plate 504 also each include a bracing structure 518 that provides a brace for torsion springs 520.

Figure 8A:
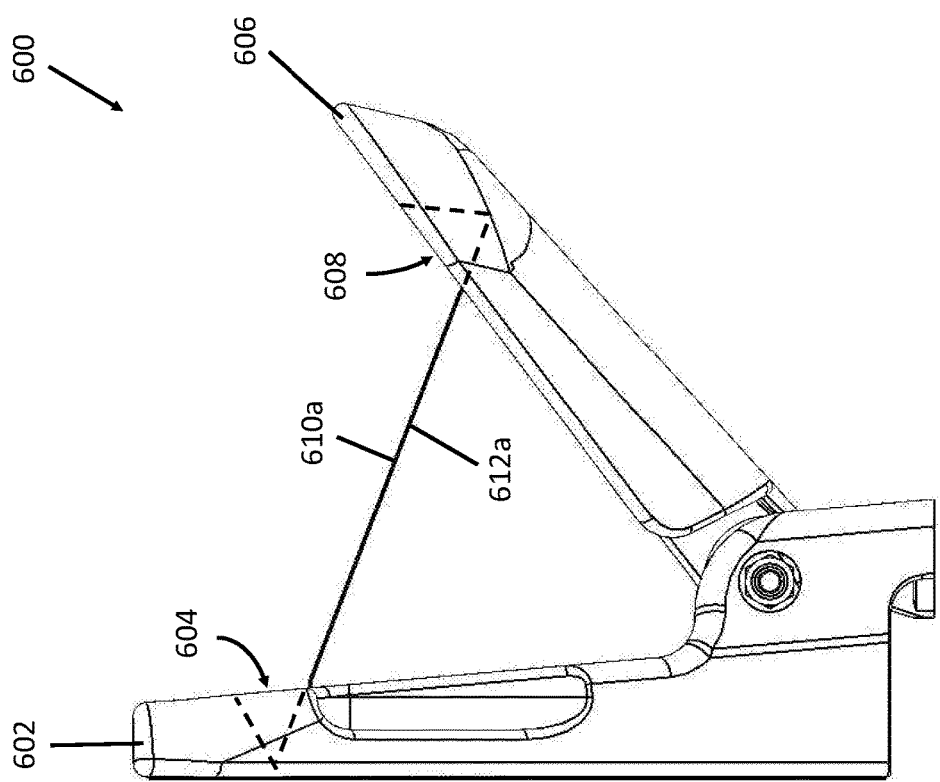
FIGS. 8A-8C are side views of mobile device mounting systems that incorporate alternative biasing elements and/or support elements.
Figure 8B:
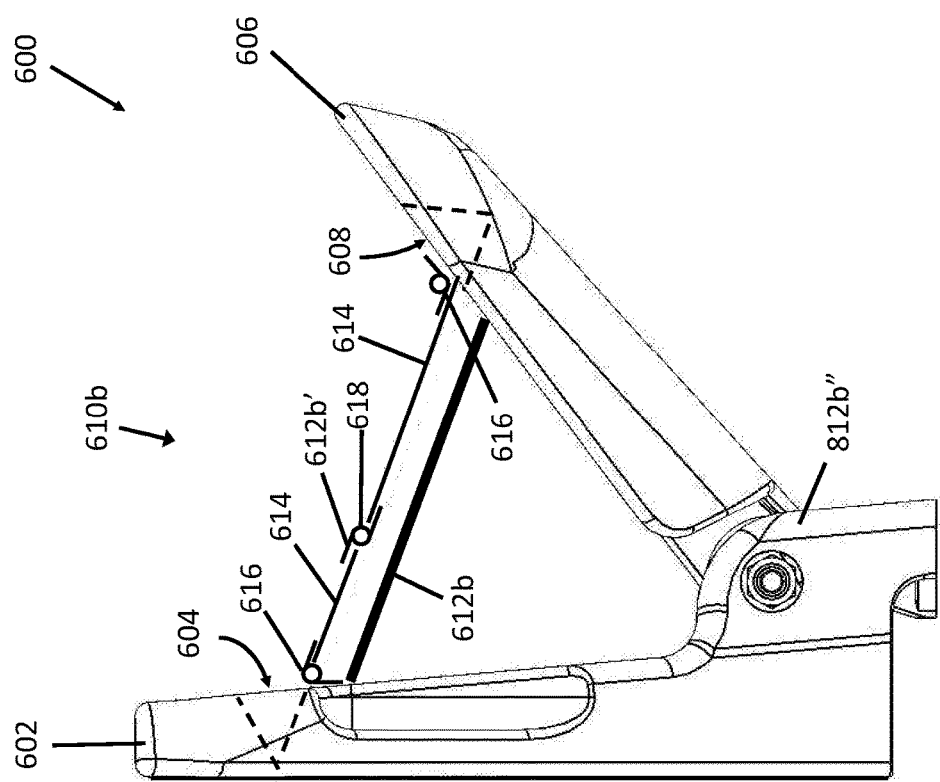

FIGS. 8A-8B are side views of mobile device mounting systems 600 that incorporate alternative biasing elements and/or support elements. Each mounting system 600 includes a fixed jaw 602 defining a groove 604 therein, as well as a pivotable jaw 606 defining a groove 608 therein. In the various examples, it is desirable that the support element is aligned with the grooves 604, 608 for reasons described herein.

With regard to FIG. 8A, the support element 610a includes an elastic sheet secured to each of the fixed jaw 602 and second jaw 606. As such, in this example, the elastic sheet acts as both the support element 610a, as well as a biasing element 612a, by drawing the pivotable jaw 606 towards the fixed jaw 602. Thus, the torsion spring at the connection point between the fixed hinge 602 and the pivotable hinge 606 may be eliminated.

With regard to FIG. 8B, the support element 610b includes a pair of rigid plates 614. One rigid plate 614 may be connected to each of the fixed jaw 602 and the pivotable jaw 606 via a hinge 616. The rigid plates 614 may be joined to each other at a live hinge, or a mechanical hinge 618, as depicted. Alternative biasing elements may be utilized to bias the pivotable jaw 606 to the closed position. In one example, one or more elastic bands 612b may be used to span the fixed jaw 602 and the pivotable jaw 606. In another example, a torsion spring 612b' may be incorporated into the mechanical hinge 618. In another example, a torsion spring 612b" at the connection point between the fixed hinge 602 and the pivotable hinge 606, as described elsewhere herein, may be utilized.

Figure 8C:
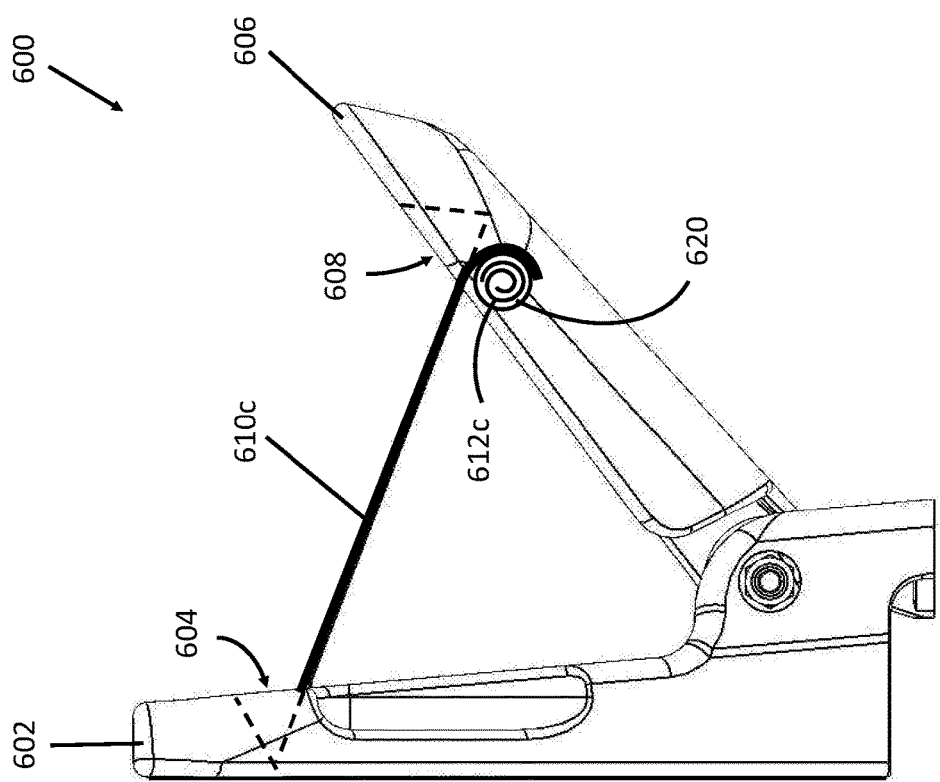

With regard to FIG. 8C, the support element 610c is an extendable sheet that is fixed at a first end to the fixed jaw 602 and wrapped about a rotatable drum 620 that is disposed within the pivotable jaw 606. As the pivotable jaw 606 is pulled away from the fixed jaw 602, the extendable sheet 610c is unwrapped from around the rotatable drum 620. A torsion spring 612c on the rotatable drum 620 acts as the biasing element, so as to retract the extendable sheet 610c and pull the pivotable jaw 606 towards the fixed jaw 602.

Figure 9:
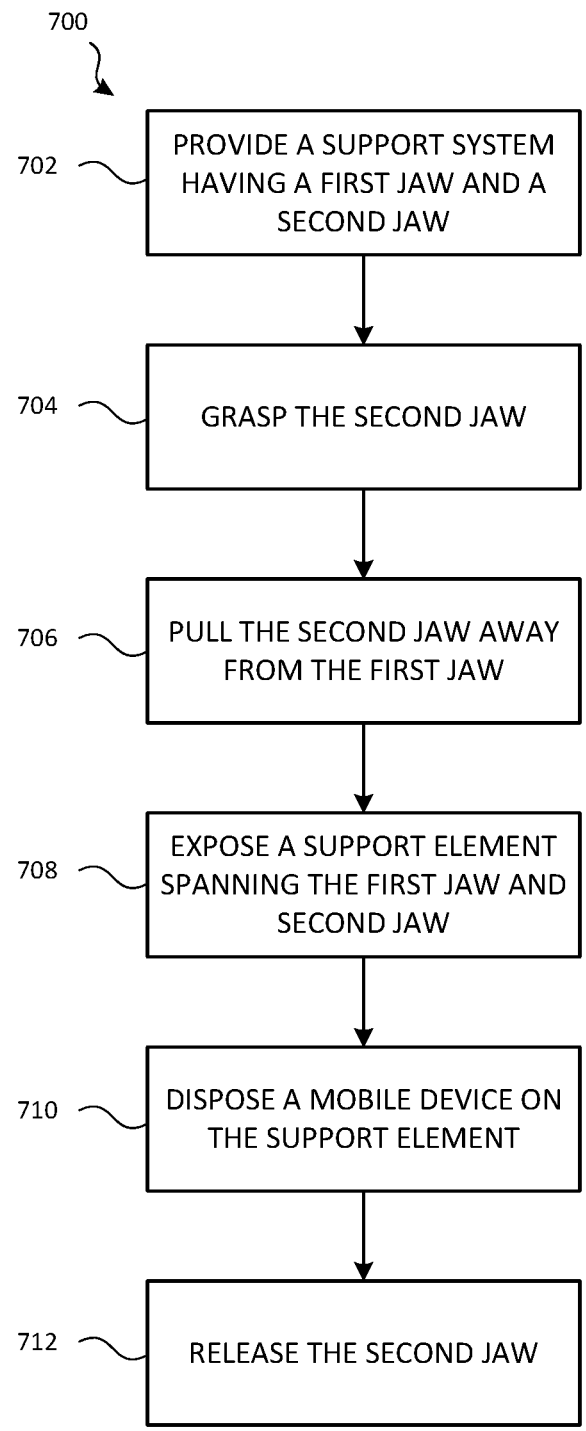
FIG. 9 depicts a method of using a mobile device mounting system.

FIG. 9 depicts a method 700 of using a mobile device mounting system, examples of which are depicted and described herein. The method 700 begins when the support system is provided (702). As previously described, the support system may include a first jaw and a second jaw pivotably connected to the first jaw. The support system may be provided on a vehicle, such as, for example, a bicycle, a scooter, an ATV and so on. When an individual wishes to secure her mobile phone to the support system, she grasps (704) the second jaw and pulls (706) the second jaw away from the first jaw.

In response, a support element is exposed (708) and is performed substantially automatically. In some example, the support element spans the first jaw and the second jaw. Once the support element is exposed, the individual places or otherwise disposes (710) the mobile device on the support element.

The individual may then release (712) the second jaw which causes the second jaw to pivot towards the first jaw. Further, by releasing the second jaw, the second jaw aligns an edge of the mobile device with a groove defined by at least one of the first jaw and the second jaw so as to sit the edge of the mobile device in the groove. Thereafter, the mobile device is secured in the mounting system until the second jaw is pulled again to release the mobile device.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A device support apparatus configured for attaching to a vehicle comprising:
   a first jaw;
   a hinge connected to the first jaw;
   a second jaw pivotably connected to the first jaw via the hinge,
   wherein the second jaw is positionable relative to the first jaw into a closed position and an open position, in the open position the first jaw and second jaw are separated and form a mouth;
   a biasing element for biasing the second jaw towards the closed position; and
   a support element spanning between the first jaw and the second jaw within the mouth.

2. The apparatus of claim 1, wherein the biasing element comprises a torsion spring.

3. The apparatus of claim 2, wherein the torsion spring is disposed proximate the hinge.

4. The apparatus of claim 1, wherein the support element comprises a flexible material.

5. The apparatus of claim 1, wherein the first jaw at least partially defines a first groove and wherein the second jaw at least partially defines a second groove, wherein the first groove is disposed on the first jaw so as to face the second groove.

6. The apparatus of claim 5, wherein the support element is substantially aligned with the first groove and the second groove when the second jaw is in the open position.

7. The apparatus of claim 6, wherein the support element is taut when the second jaw is in the open position.

8. The apparatus of claim 5, wherein the second jaw at least partially defines a gap that bisects the second groove, and wherein the support element is connected to the second jaw on two sides of the gap.

9. The apparatus of claim 1, wherein the support element comprises the biasing element.

10. The apparatus of claim 9, wherein the support element further comprises a plurality of rigid elements and a hinge pivotably connecting the plurality of rigid elements.

11. The apparatus of claim 1, wherein the biasing element comprises an elastic element.

12. A method of accessing a support system comprising a first jaw and a second jaw pivotably connected to the first jaw, the method comprising:
   grasping the second jaw;
   pulling the second jaw away from the first jaw thus forming a mouth therebetween;
   exposing a support element spanning between the first jaw and the second jaw within the mouth;
   disposing a mobile device on the support element; and
   releasing the second jaw,
   wherein releasing the second jaw causes the second jaw to pivot towards the first jaw.

13. The method of claim 12, further comprising providing the support system.

14. The method of claim 12, wherein releasing the second jaw aligns an edge of the mobile device with a groove defined by at least one of the first jaw and the second jaw so as to sit the edge in the groove.

* * * * *